United States Patent
Skiller et al.

(10) Patent No.: US 6,561,559 B1
(45) Date of Patent: May 13, 2003

(54) BEARING UNIT, IN PARTICULAR RAILWAY AXLEBOX BEARING UNIT, HAVING IMPROVED ANTI-FRETTING BEHAVIOR

(75) Inventors: John Vincent Skiller, Soest (NL); Vedran Tadic, St. Cyr-Loire Cedex (FR); Marc Defossez, Odijk (NL); Dario Bertorelli, Villar Perosa (TO) (IT); Maurizio Martinetti, Turin (IT); Enrico Rolih, Turin (IT)

(73) Assignee: SKF Engineering and Research Centre B.V. (NL)

( * ) Notice: Subject to any disclaimer, the term of this patent is extended or adjusted under 35 U.S.C. 154(b) by 0 days.

(21) Appl. No.: 09/646,666
(22) PCT Filed: Mar. 23, 1999
(86) PCT No.: PCT/NL99/00161
§ 371 (c)(1),
(2), (4) Date: Oct. 17, 2000
(87) PCT Pub. No.: WO99/48742
PCT Pub. Date: Sep. 30, 1999

(30) Foreign Application Priority Data

Mar. 23, 1998 (NL) .............................................. 1008681

(51) Int. Cl.⁷ .............................................. B60B 35/00
(52) U.S. Cl. .......................... 295/36.1; 295/38; 295/42.1
(58) Field of Search ........................ 295/36.1, 38, 42.1; 384/476; 277/602, 608, 627, 628, 650

(56) References Cited

U.S. PATENT DOCUMENTS

| | | | | | |
|---|---|---|---|---|---|
| 2,025,342 | A | * | 12/1935 | Oelkers ...................... | 295/36.1 |
| 2,041,162 | A | * | 5/1936 | Buckwalter ................ | 295/36.1 |
| 3,602,150 | A | * | 8/1971 | Frost .......................... | 295/36.1 |
| 3,628,837 | A | * | 12/1971 | Otto ........................... | 308/187 |
| 3,888,187 | A | * | 6/1975 | Van Moss, Jr. ............ | 295/36.1 |
| 4,942,826 | A | * | 7/1990 | Erickson et al. ........... | 295/36.1 |

* cited by examiner

Primary Examiner—S. Joseph Morano
Assistant Examiner—Long Bae Nguyen
(74) Attorney, Agent, or Firm—Oliff & Berridge, PLC

(57) ABSTRACT

A unit comprises a double row taper rolling element bearing (1) having an inner ring means (12, 13) and an outer ring means (6), said inner ring means being fitted on an axle stub (5) between two opposite mounting faces (7, 10), means (19) being provided for preventing fretting corrosion between at least one of said mounting faces and the inner ring means. At least one mounting face and the inner ring means engage each other by means of a polymer support ring (19). The bearing unit can be applied as a railway axlebox bearing unit.

28 Claims, 6 Drawing Sheets

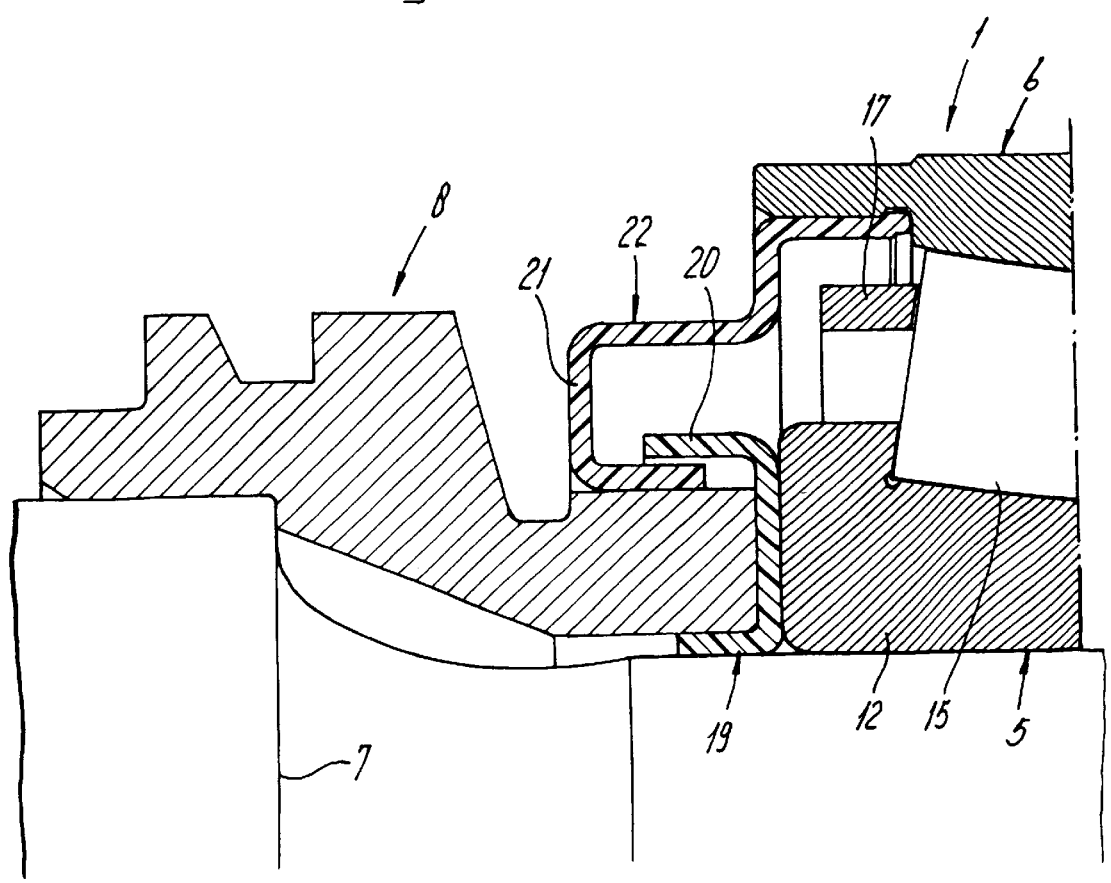

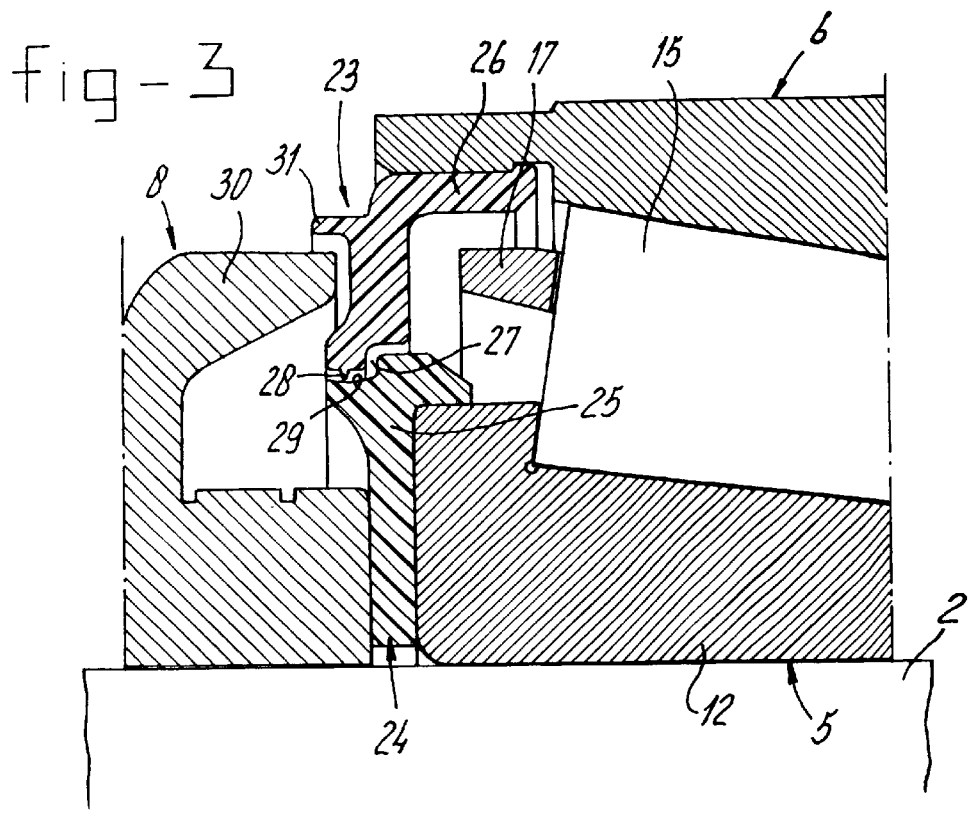
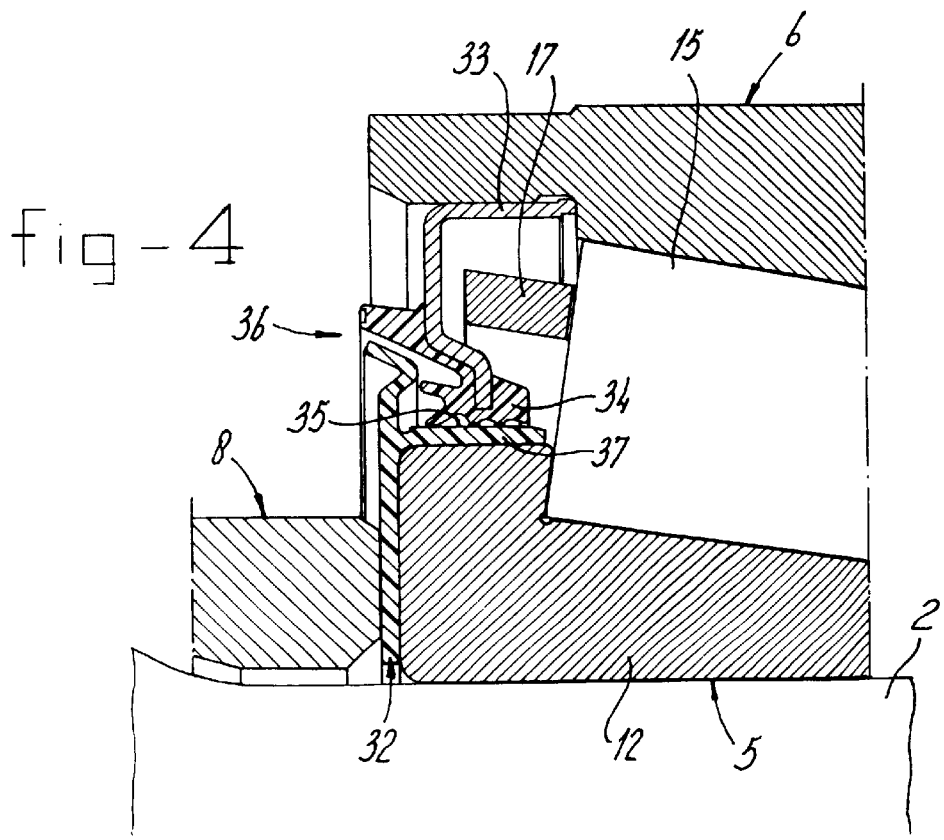

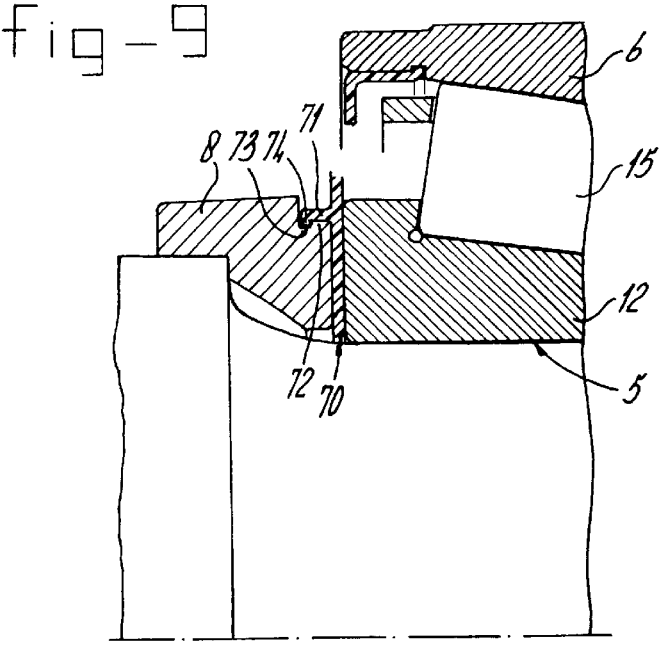
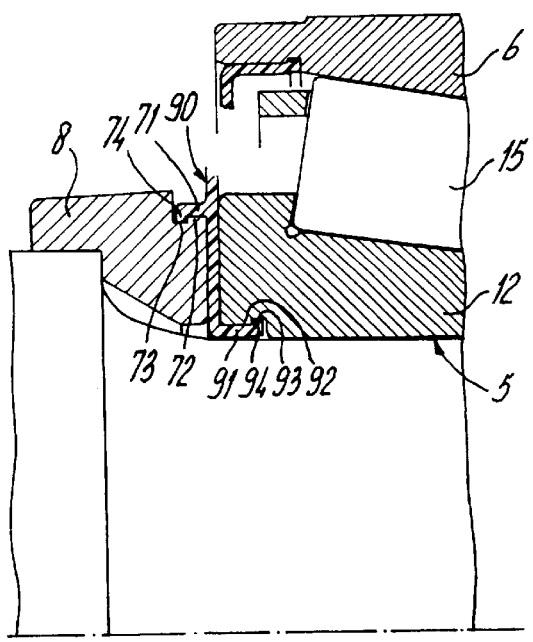
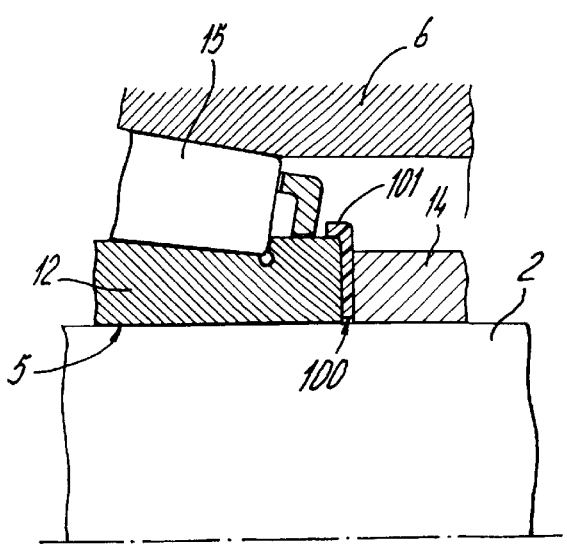

BEARING UNIT, IN PARTICULAR RAILWAY AXLEBOX BEARING UNIT, HAVING IMPROVED ANTI-FRETTING BEHAVIOR

The invention is related to a bearing unit, comprising a rolling element bearing having an inner ring means and an outer ring means, said inner ring means being fitted on an axle stub between two opposite mounting faces, means being provided for preventing fretting corrosion between at least one of said mounting faces and the inner ring means.

A railway axlebox bearing unit of this type is known from JP-A-972344. Said unit has an interposed layer between the shoulder and the backup ring, which is less hard than the material of said parts. The interposed layer aims at reducing fretting corrosion, which would normally occur as a result of the fluctuating loads in the train bearing unit while in service.

The layer in question may be adhered or plated onto the backup ring. This entails the manufacturing of a special backup ring, which limits the flexibility in use of such rings.

The object of the invention is to provide a fretting corrosion means for bearing units which is more versatile. This object is achieved in that at least one mounting face and the inner ring means engage each other by means of a non-metallic support ring, preferably a polymer support ring.

The non-metallic support ring according to the invention constitutes a separate engineering piece, which can be used in conjunction with standard parts of the train bearing unit in question, e.g. a standard backup ring.

The non-metallic support ring may be applied in several ways. Generally, the inner ring means is fitted between a shoulder of the stub and an end bracket bolted onto said stub, said inner ring means engaging the shoulder by means of a backup ring. According to the invention, the backup ring engages the inner ring means by means of a non-metallic support ring.

Furthermore, the inner ring means may engage the end bracket directly by means of a non-metallic support ring.

Also, the inner ring means may engage the end bracket indirectly by means of a pressure ring, said pressure ring engaging the inner ring means by means of a non-metallic support ring.

The bearing unit in may be provided with inner ring means which comprise two inner rings enclosing a spacer ring, in particular in the case of railway axlebox bearing units. According to a further possibility, said spacer ring may engage at least one of the inner rings by means of a non-metallic support ring.

As the support ring is a separate piece, it may fulfil additional functions. For instance, the support ring may comprise a labyrinth ring part so as to form a labyrinth seal in conjunction with a further labyrinth seal part connected to the outer ring.

The support ring may be given any desired shape so as to provide the required sealing function. Also, a soft rubber sealing lip may be moulded onto the labyrinth seal for providing full tightness of the internal bearing space.

Furthermore, the support ring may comprise sensor means for sensing the bearing rotation. Said sensor may be applied e.g. for monitoring of the axle in question, such as temperature, vibrations, or number of revolutions.

Additionally, the support ring may be applied for providing a grease reservoir, so as to ensure long-term lubrication of the train bearing unit.

The support ring may be fixed in several ways, and may be premounted e.g. by clamping. In this respect, the support ring and the inner ring means engage each other by means of a groove-rib connection.

Furthermore, the support ring may be connected to a backup ring or to a pressure ring. Also, the support ring may be connected to a spacer ring.

The support ring may be connected in several ways. Preferably, the support ring comprises an axial extension, which engages a recess in the inner ring or in the backup ring.

The recess may comprise an undercut groove, and the axial extension may comprise a tongue which is snapped into the undercut groove.

Furthermore, the support ring may have a tubular extension accommodated in a recess of the inner ring means.

The bearing unit according to the invention is particularly suitable for a railway axlebox bearing unit. In such application, the area between the railway wheel and the wheel box is critically loaded. In service, bending and radial displacements occur, which lead to corresponding bending and radial movements between the inner bearing ring and the railway wheel, resulting in an orbital movement.

Moreover, fretting-induced corrosion may occur in this area.

According to the invention, these adverse effects are avoided by means of the non-metallic support ring, in particular a polymer support ring.

The bearing may be a double row cylinder or a double row taper rolling bearing. Also, a ball bearing may be applied.

The invention will now be described further with reference to several embodiment shown in the Figures.

FIG. 2 shows an enlarged detail of FIG. 1.

FIGS. 3–11 show further embodiments of the train bearing unit.

Figure 1:
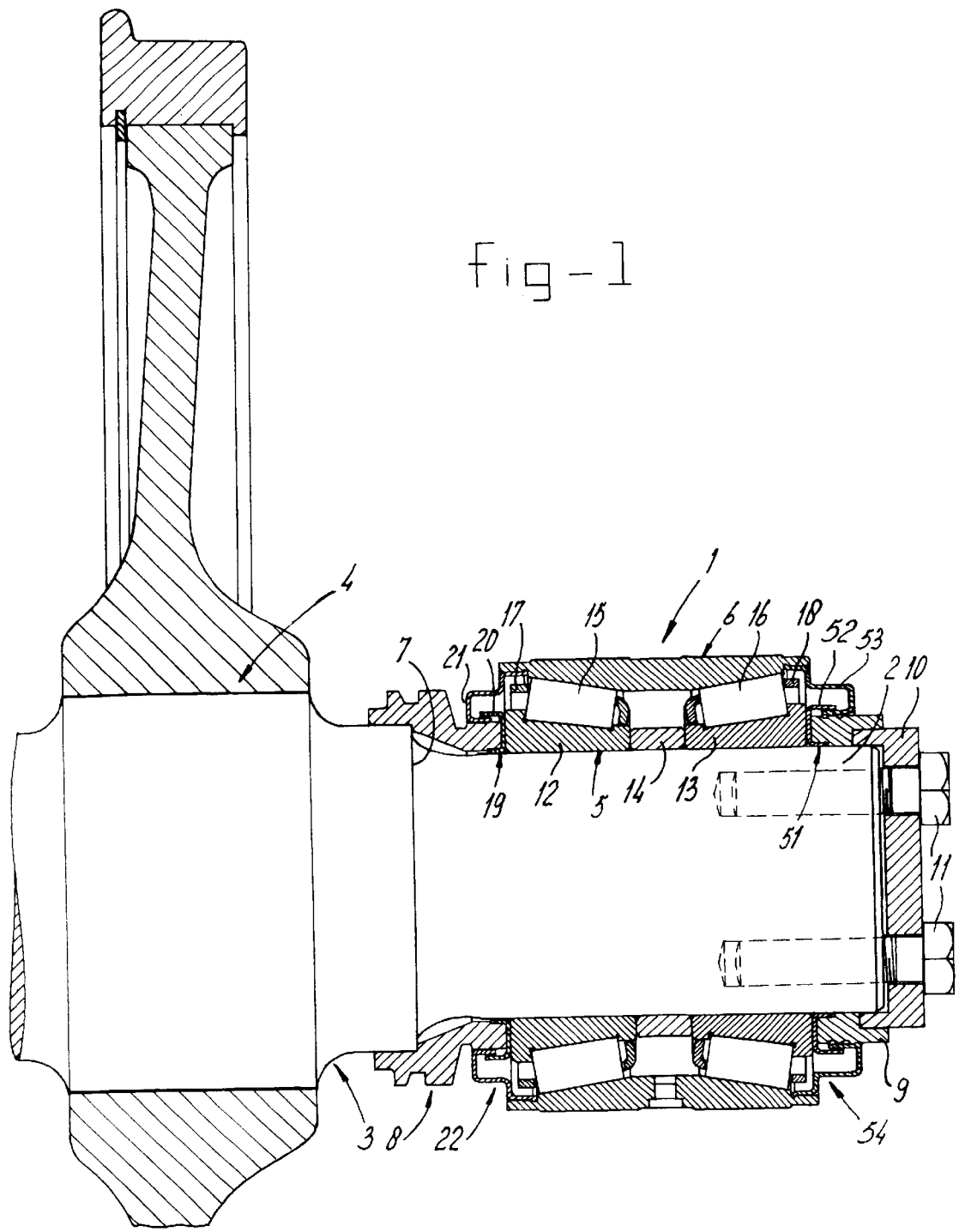
FIG. 1 shows a train bearing unit according to the invention, together with part of a train wheel and shaft.

The train bearing unit shown in FIG. 1 comprises a double row taper rolling element bearing 1, fitted onto the axle stub 2 of shaft 3. Shaft 3 also carries a railway wheel 4. On the other end of the shaft 3, a similar axle stub with double row taper rolling element bearing, and a railway wheel are mounted The double row taper rolling element bearing 1 has an inner ring means 5 press fitted onto the axle stub 2, and outer ring means 6 fitted into a support of an axle box in a railway bogey (not shown).

The axle stub has a shoulder 7, which by means of backup ring 8 engages the inner ring means 5. On the other end, the inner ring means 5 engages a pressure ring 9, which in turn by means of end cap 10 and bolts 11 is maintained in position on the axle stub 2.

By means of the bolts 11, the inner ring means 5, backup ring 8 and pressure ring 9 can be held under the required axial compression force.

The inner ring means 5 in the embodiment shown consists of two inner rings 12, 13, which are mutually supported by spacer ring 14. Each of the inner rings 12, 13 comprises a tapered raceway.

The outer ring means 6 consist of a single ring, carrying two tapered raceways.

Between the raceways of inner rings 12, 13 and outer rings 6, two series of rolling elements 15, 16 are accommodated. These series are held apart by means of cages 17, 18.

The outer ring means 6 is held non-rotatably in the (not shown) axle support of a railway bogey, whereas the inner ring means 5 rotates together with the axle 3.

The axle 3 is loaded by the weight of the railway vehicle superstructure on the axle box. Thereby, bending couples in a vertical plain, resulting from the forces acting on the railway wheel 4 on the one hand and the axle stub 2 on the other hand, are generated, leading to variations in the compressive force experienced by the inner ring means 5, the backup ring 8 and the pressure ring 9. As a result of these fluctuations, compression and shear stress variations occur, normally causing fretting corrosion, which is detrimental to the proper function of the train bearing unit.

The most vulnerable area in this respect is constituted by the contact between the inner ring 12 of the inner ring means 5 and the backup ring 8. According to the invention therefor a polymer support ring 19 is interposed between these elements. Said polymer support ring prevents fretting corrosion to occur on the facing surfaces of inner ring 12 and backup ring 8.

Furthermore, such polymer ring 50 may also be accommodated between the inner ring 13 and the pressure ring 9. Here as well, a labyrinth seal part 52 is provided, which together with the adjoining labyrinth seal part 21, connected to the outer ring means 6, forms a labyrinth seal 54.

In the enlarged view of FIG. 2 this polymer support ring is shown on an enlarged scale.

Moreover, the polymer support ring 19 according to the invention may fulfil additional functions. In the embodiment of FIG. 2, the polymer support ring 19 has a labyrinth seal part 20, which together with the adjoining labyrinth seal part 21 connected to outer ring means 6, forms a labyrinth seal 22.

The embodiment of FIG. 3 shows an alternative embodiment for a seal 23. This seal 23 comprises a first seal part 25 which is integrated with polymer support 25 ring 24, and a second seal part 26 connected to outer ring means 6. The seal parts 25, 26 enclose an S-shaped crevice, and furthermore the seal part 26 has a lip 28 extending towards a flat surface 29 of seal part 25, so as to improve the sealing action.

Backup ring 8 also a labyrinth part 30, which, together labyrinth part 31 seal part 26, forms a labyrinth seal.

The embodiment of FIG. 4 shows a seal 36, constituted by surface 35 of leg 37 of the polymer backup ring 32, seal ring 33 connected to outer ring means 6, and flexible seal 34. The flexible seal 34 engages surface 35 of leg 37, whereby a complete sealing of the bearing space between outer ring means 6 and inner ring means 5 is obtained.

Figure 5:
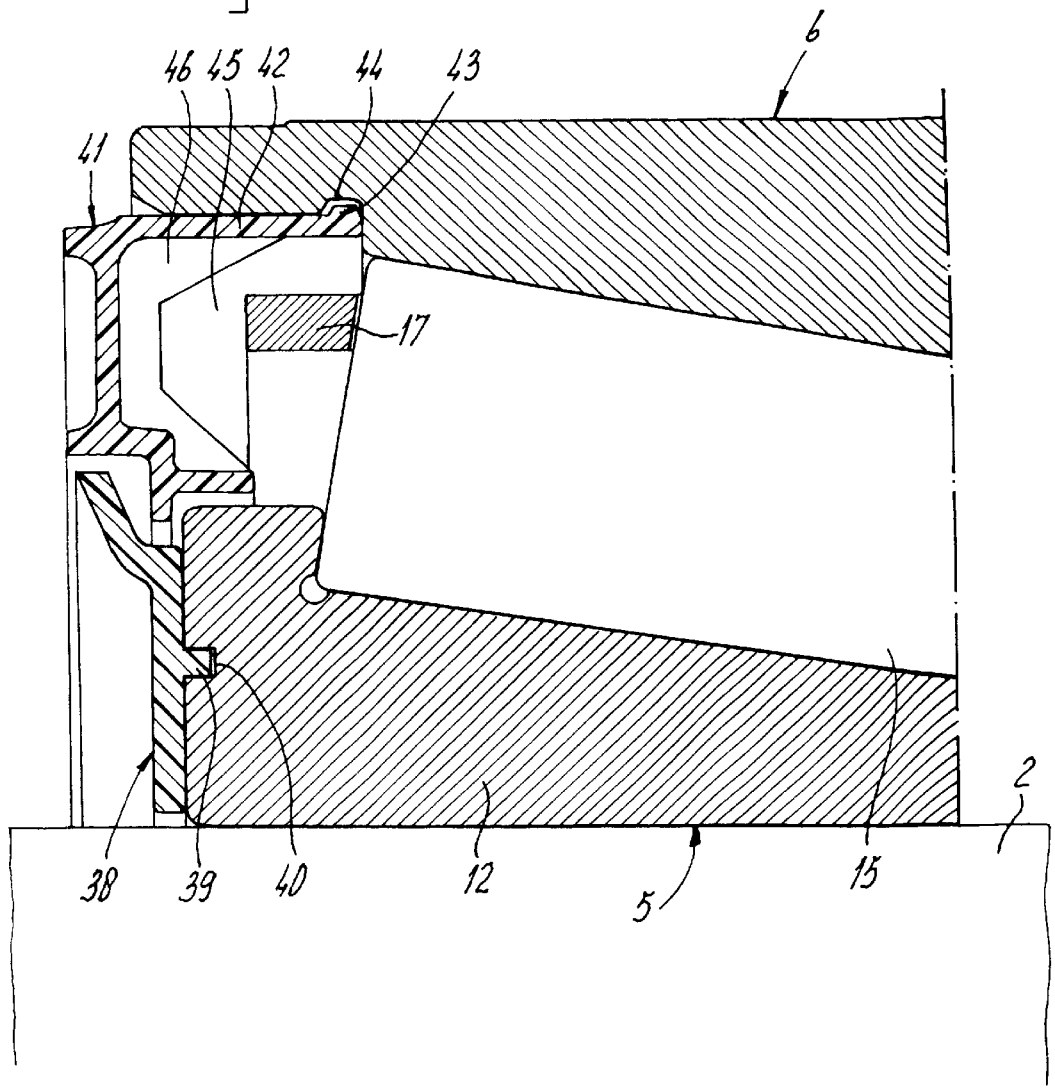

The embodiment of FIG. 5 comprises a polymer backup ring 38 having a rib 39, which engages a slit 40 in the end surface of inner ring 12. Thus, the polymer support ring is clamped fixedly onto the inner ring 12.

Onto the outer ring 6, a seal ring 41 is mounted, which seal ring 41 has fingers 42 comprising an outwardly protruding ridge 43, which engage the internal groove 44 of the outer ring 6. Thereby, also seal ring 41 is clamped fixedly onto the outer ring means 6.

Seal ring 41 is shaped in such a way that it bounds an internal space 45 having ribs or fingers 46. Within this space, an amount of grease may be present.

Figure 6:
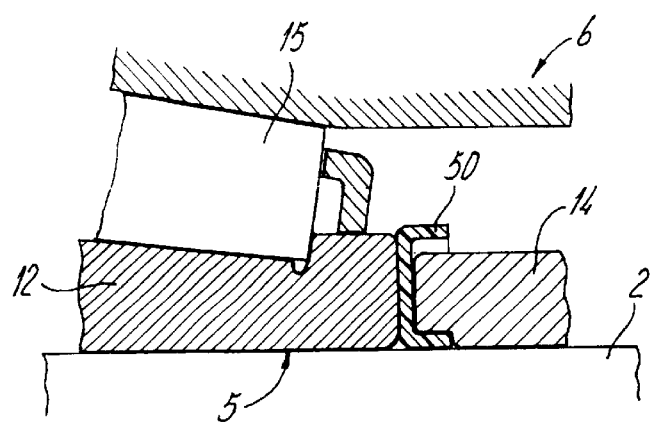

FIG. 6 shows a further embodiment, wherein a polymer support ring 50.is accommodated between the inner ring 12 and the spacer ring 14. At the other side face (not shown) of said spacer ring, a similar support ring may be arranged as well.

Figure 7:
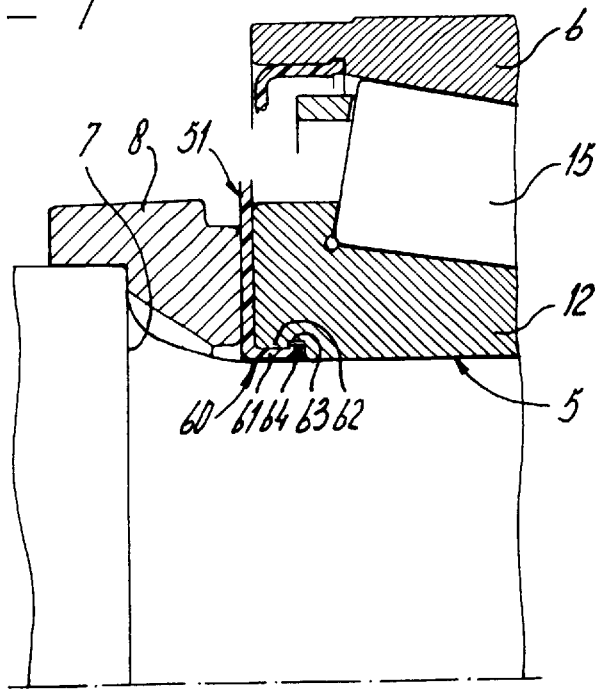

The embodiment shown in FIG. 7 comprises a support ring 60 which has a radial extension 61, provided with a tongue 64 which is snapped into under cut groove 63 of recess 62. Thus, said support ring is connected to the inner ring 12.

Figure 8:
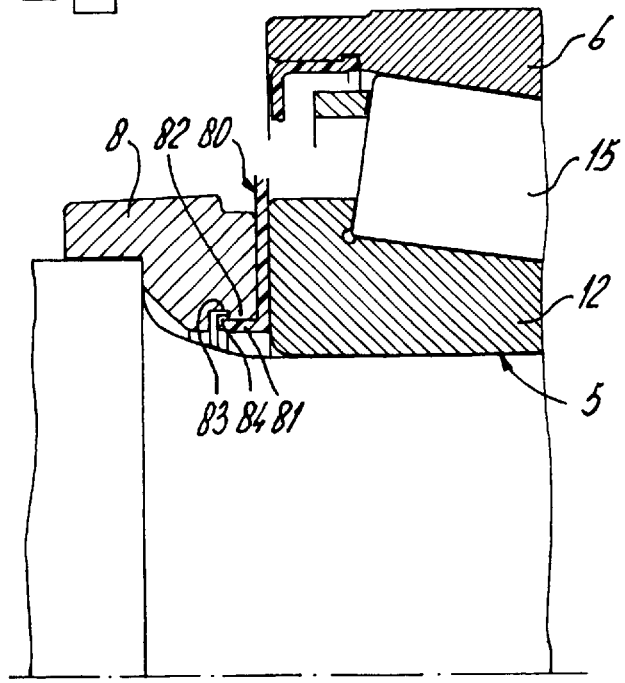

The support ring 80 in the embodiment of FIG. 8 is connected to backup ring 8. To that end, the support ring 80 has a radial extension 81 which by means of tongue 84 is snap-fitted into undercut groove 83 of recess 82.

The support ring 80 of the embodiment of FIG. 9 is connected to backup ring 8, at the inner circumference of the latter. This is also achieved by means of tongue 74 of radial extension 71, snap-fitted in the undercut groove 73 of recess 72.

In the embodiment of FIG. 10, the backup ring 8 and the inner ring 12 are mutually connected through the support ring 90, which has two opposite radial extensions 71, 91. As a result, the bearing together with backup ring and support ring can be handled as a unity, which has benefits related to storage, handling, an installation.

As shown in FIG. 11, the support ring 100 between the inner ring half 12 and the spacer ring 14 can also be connected by means of radial extension 101.

What is claimed is:

1. Railway axlebox bearing unit, comprising a rolling element bearing having an inner ring means and an outer ring means, said inner ring means being fitted on an axle stub between two opposite mounting faces, wherein said at least one mounting face and the inner ring means is contacted by a non-metallic polymer support ring which constitutes a separate engineering piece for preventing fretting corrosion between at least one of the two mounting faces and the inner ring means.

2. Railway axlebox bearing unit according to claim 1, wherein the inner ring means is fitted between a shoulder of the stub and an end bracket bolted onto said stub, said inner ring means engaging the shoulder by a backup ring, said backup ring engaging the inner ring means by a non-metallic support ring.

3. Railway axlebox bearing unit according to claim 1, wherein the inner ring means engages an end bracket by a non-metallic support ring.

4. Railway axlebox bearing unit according to claim 1, wherein the inner ring means engages an end bracket by a pressure ring, said pressure ring engaging the inner ring means by a non-metallic support ring.

5. Railway axlebox bearing unit according to claim 1, wherein the inner ring means comprises two inner rings which enclose a spacer ring, said spacer ring engaging at least one of the inner rings by a non-metallic support ring.

6. Railway axlebox bearing unit according to claim 1, wherein the non-metallic support ring comprises a labyrinth seal part so as to form a labyrith seal in conjunction with a further labyrinth seal part connected to the outer ring means.

7. Railway axlebox bearing unit according to claim 1, wherein the support ring comprises sensor means for sensing the bearing rotation.

8. Railway axlebox bearing unit according to claim 1, wherein the support ring delimits a grease reservoir.

9. Railway axlebox bearing unit according to claim 1, wherein the support ring is connected to the inner ring means.

10. Railway axlebox bearing unit according to claim 1, wherein the support ring is connected to the backup ring.

11. Railway axlebox bearing unit according to claim 1, wherein the supporting ring is connected to a pressure ring.

12. Railway axlebox bearing unit according to claim 1, wherein the support ring is connected to a spacer ring.

13. Railway axlebox bearing unit according to claim 1, wherein the support ring comprises an axial extension, which engages a recess in the inner ring.

14. Railway axlebox bearing unit according to claim 1, wherein the support ring comprises a radial extension, which engages a recess in a backup ring.

15. Railway axlebox bearing unit according to claim 1, wherein the support ring comprises a radial extension which engages a recess in a pressure ring.

16. Railway axlebox bearing unit according to claim 13, wherein the recess comprises an undercut groove and the axial extension comprises a tongue which is snapped into the undercut groove.

17. Railway axlebox bearing unit according to claim 13, wherein the support ring has two opposite axial extensions, one of which engaging the inner ring, and the other of which engaging a backup ring.

18. Railway axlebox bearing unit according to any of claim 13, wherein the support ring has two opposite social extensions, one of which engaging the inner ring, two other of which engaging a pressure ring.

19. Railway axlebox bearing unit according to claim 13, wherein at least one recess is on the inner surface of the inner ring, a backup ring and a pressure ring.

20. Railway axlebox bearing unit according to claim 13, wherein at least one recess is on the outer surface of one of the inner ring, a backup ring and a pressure ring.

21. Railway axlebox bearing unit according to claim 13, wherein at least one recess extends over the full circumference of one of the inner ring, a backup ring and a pressure ring.

22. Railway axlebox bearing unit according to claim 21, wherein at least one axial extension is continuous in a circumferential direction of the support ring.

23. Railway axlebox bearing unit according to claim 1, wherein the polymer support ring comprises a reinforcement material, such as fibres.

24. Railway axlebox bearing unit according to claim 23, wherein the reinforcement material is a knitted, woven or non-woven layer of fibre material.

25. Railway axlebox bearing unit according to claim 23, wherein the fibres comprise glass fibres.

26. Railway axlebox bearing unit according to claim 1, wherein the support ring comprises a polymer material.

27. Railway axlebox bearing unit according to claim 1, wherein the support ring comprises a resin material.

28. Railway axlebox bearing unit according to claim 1, wherein the bearing is a double row taper rolling element bearing.

\* \* \* \* \*